United States Patent
Sasaki et al.

(10) Patent No.: US 11,772,492 B1
(45) Date of Patent: Oct. 3, 2023

(54) HEAD-UP DISPLAY

(71) Applicant: Panasonic Intellectual Property Management Co., Ltd., Osaka (JP)

(72) Inventors: Kousuke Sasaki, Kanagawa (JP); Daiki Kawai, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/101,431

(22) Filed: Jan. 25, 2023

(30) Foreign Application Priority Data

Jun. 29, 2022 (JP) .................................. 2022-104838

(51) Int. Cl.
*B60K 37/02* (2006.01)
*G02B 27/01* (2006.01)

(52) U.S. Cl.
CPC .......... *B60K 37/02* (2013.01); *G02B 27/0149* (2013.01); *B60K 2370/1529* (2019.05); *G02B 2027/0154* (2013.01); *G02B 2027/0169* (2013.01)

(58) Field of Classification Search
CPC ........ B60K 37/02; B60K 2370/1529; G02B 27/01; G02B 27/0149; G02B 2027/0154; G02B 2027/0169
See application file for complete search history.

(56) References Cited

U.S. PATENT DOCUMENTS

| 2011/0134498 A1* | 6/2011 | Ohta ................. G02B 26/0816 |
| | | 359/200.7 |
| 2021/0003815 A1 | 1/2021 | Tabata et al. |
| 2021/0132332 A1* | 5/2021 | Fujimoto ................ F16C 27/02 |
| 2021/0211014 A1* | 7/2021 | Chykeyuk .............. G02B 30/54 |

FOREIGN PATENT DOCUMENTS

| JP | 2019-174674 A | 10/2019 |
| JP | 2021-75248 A | 5/2021 |
| JP | 2021-165777 A | 10/2021 |

* cited by examiner

*Primary Examiner* — Darlene M Ritchie
*Assistant Examiner* — Cory A Almeida
(74) *Attorney, Agent, or Firm* — GREENBLUM & BERNSTEIN, P.L.C.

(57) ABSTRACT

A head-up display includes: a display device that emits image light; a mirror that reflects the image light; a mirror holder that includes a rotating shaft; and a bearing that rotatably supports the rotating shaft. The mirror holder supports the mirror from a back surface side of the mirror. The rotating shaft comprises a first rotating shaft located outside a perimeter of the mirror as viewed from the back surface side of the mirror, and a second rotating shaft located inside the perimeter of the mirror as viewed from the back surface side of the mirror. The second rotating shaft is provided on an axis same as an axis of the first rotating shaft. The bearing supports the first rotating shaft and the second rotating shaft.

12 Claims, 7 Drawing Sheets

HEAD-UP DISPLAY

CROSS REFERENCE TO RELATED APPLICATION

The present application is based on and claims priority of Japanese Patent Application No. 2022-104838 filed on Jun. 29, 2022.

FIELD

The present disclosure relates to a head-up display including a mirror that reflects image light.

BACKGROUND

Patent Literature (PTL) 1 discloses a head-up display in which a mirror (movable mirror) that reflects image light (display light) is rotatably supported by a bearing stand.

CITATION LIST

Patent Literature

PTL 1: Japanese Unexamined Patent Application Publication No. 2021-75248

SUMMARY

However, the head-up display according to PTL 1 can be improved upon.

In view of this, the present disclosure provides a head-up display capable of improving upon the above relate art.

A head-up display according to one aspect of the present disclosure includes: a display device that emits image light; a mirror that reflects the image light; a mirror holder that includes a rotating shaft; and a bearing that rotatably supports the rotating shaft. The mirror holder supports the mirror from a back surface side of the mirror. The rotating shaft comprises a first rotating shaft located outside a perimeter of the mirror as viewed from the back surface side of the mirror, and a second rotating shaft located inside the perimeter of the mirror as viewed from the back surface side of the mirror. The second rotating shaft is provided on an axis same as an axis of the first rotating shaft. The bearing supports the first rotating shaft and the second rotating shaft.

A head-up display according to one aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

[Circumstances Leading to the Present Disclosure]

Circumstances that had led to the present disclosure will be described with reference to FIG. 1 through FIG. 4.

Figure 1:
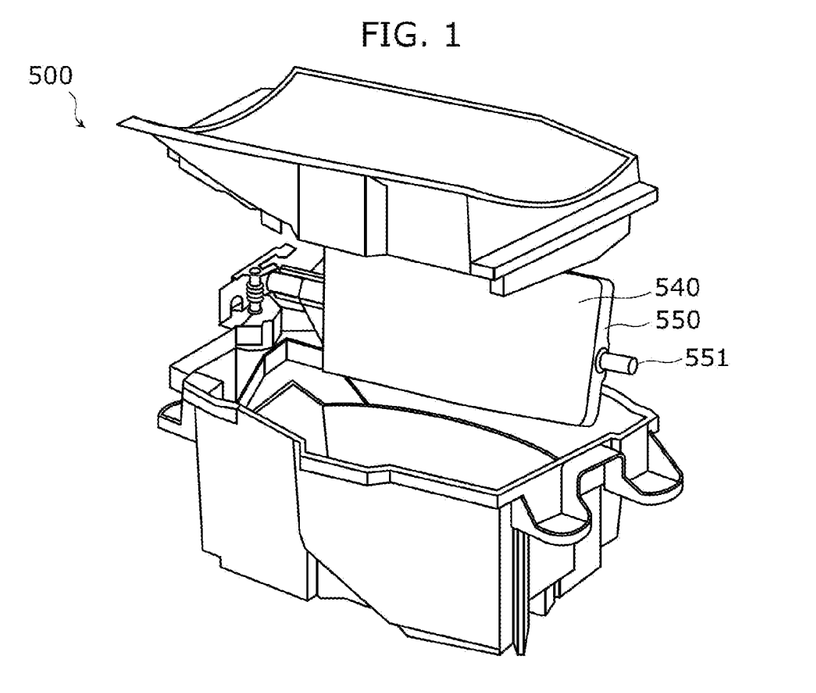
FIG. 1 is an exploded perspective view of part of a head-up display according to comparative example 1.

FIG. 1 is an exploded perspective view of part of a head-up display according to comparative example 1.

As illustrated in FIG. 1, head-up display 500 according to comparative example 1 includes mirror 540 that reflects image light emitted from a display device. Mirror 540 is attached to mirror holder 550 that includes rotating shaft 551. For example, mirror 540 includes a glass material, and mirror holder 550 includes a resin material or a metallic material. Head-up display 500 causes mirror 540 to rotate via mirror holder 550 to adjust a display location that matches with a user's eye level.

Figure 2:
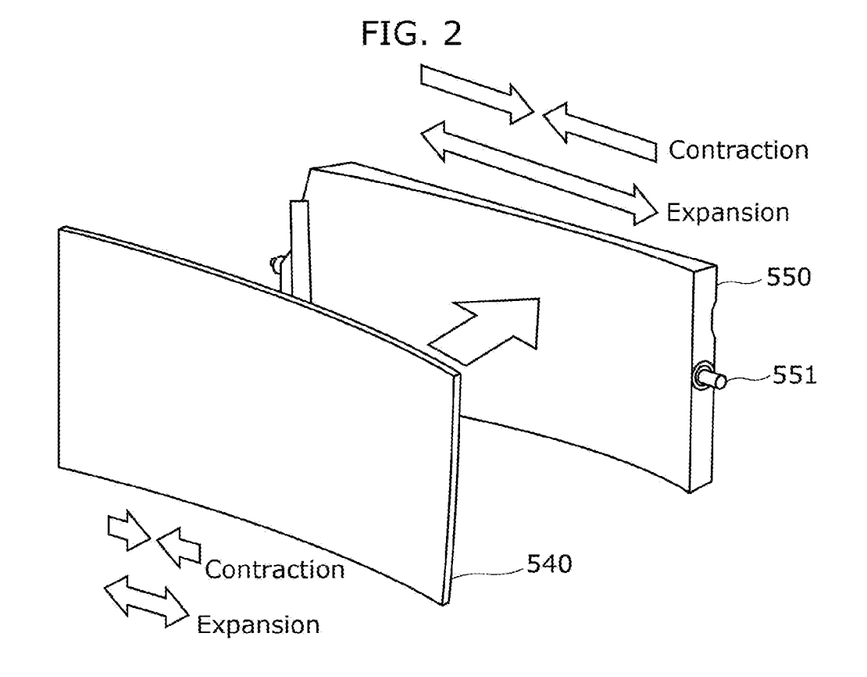
FIG. 2 is a diagram illustrating a mirror and a mirror holder of the head-up display according to comparative example 1.

FIG. 2 is a diagram illustrating mirror 540 and mirror holder 550 of head-up display 500 according to comparative example 1. In the diagram, mirror holder 550 is being separated from mirror 540.

As illustrated in FIG. 2, mirror holder 550 according to comparative example 1 is formed so as to cover the whole back surface of mirror 540. For this reason, upsizing of mirror 540 for displaying a larger image also increases the area size of mirror holder 550. When, for example, ambient temperature changes, mirror 540 and mirror holder 550 expand or contract. This results in application of a thermal stress to mirror 540 due to a difference in coefficients of linear expansion between materials included in mirror 540 and mirror holder 550. For this reason, head-up display 500 according to comparative example 1 poses a problem of distortion or breakage of mirror 540.

Figure 3:
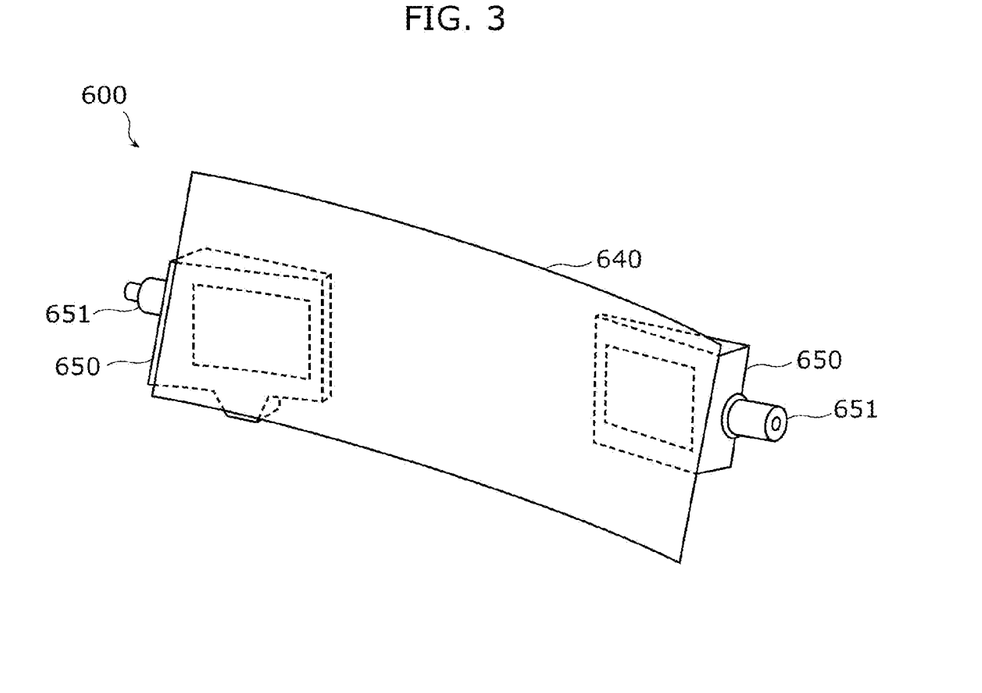
FIG. 3 is a diagram illustrating a mirror and mirror holders of a head-up display according to disclosure example 1.

FIG. 3 is a diagram illustrating mirror 640 and mirror holders 650 of head-up display 600 according to disclosure example 1. As illustrated in FIG. 3, head-up display 600 according to disclosure example 1 avoid application of a thermal stress to mirror 640 by dividing mirror holder 650 into two mirror holders and attaching the two mirror holders 650 each having a small area size to respective end portions of mirror 640. However, disclosure example 1 can be improved upon as follows.

Figure 4:
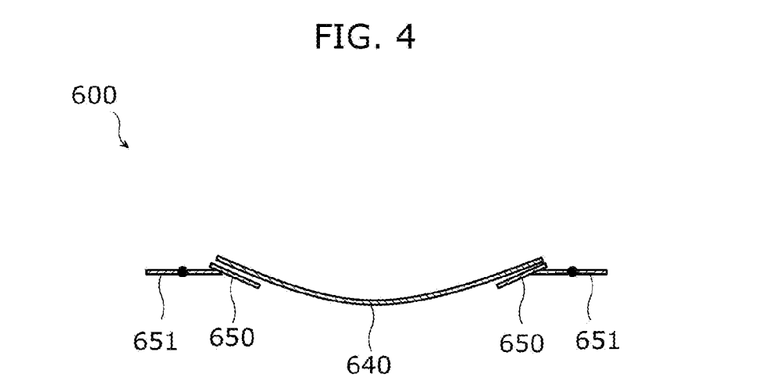
FIG. 4 is a diagram schematically illustrating a supporting state of the mirror and the mirror holders in the head-up display according to disclosure example 1.

FIG. 4 is a diagram schematically illustrating a supporting state of mirror 640 and mirror holders 650 in head-up display 600 according to disclosure example 1.

As illustrated in FIG. 4, rotating shaft 651 of the left mirror holder 650 and rotating shaft 651 of the right mirror holder 650 are supported at one point on the left side and one point on the right side, respectively, in head-up display 600 according to disclosure example 1 (see black points in FIG. 4). For this reason, vibrations transmitted from a vehicle when the vehicle is driven may cause mirror holders 650 and mirror 640 to be misaligned. When mirror 640 is misaligned, image light reflected by mirror 640 will be misaligned.

In view of the above, the embodiment presents the following configuration for preventing misalignment of a mirror due to vibrations.

Hereinafter, embodiments will be described in detail with reference to the drawings. Note that the embodiments described below each show a specific example of the present disclosure. The numerical values, shapes, materials, structural elements, the arrangement and connection of the structural elements, steps, orders of the steps etc. illustrated in the following embodiments are mere examples, and are not intended to limit the present disclosure. In addition, among the structural elements in the embodiments below, those not recited in any one of the independent claims representing the most generic concepts will be described as optional structural elements.

Embodiment

[Example of Usage of Head-Up Display]

An example of usage of head-up display 100 according to the embodiment will be described with reference to FIG. 5 and FIG. 6.

Figure 5:
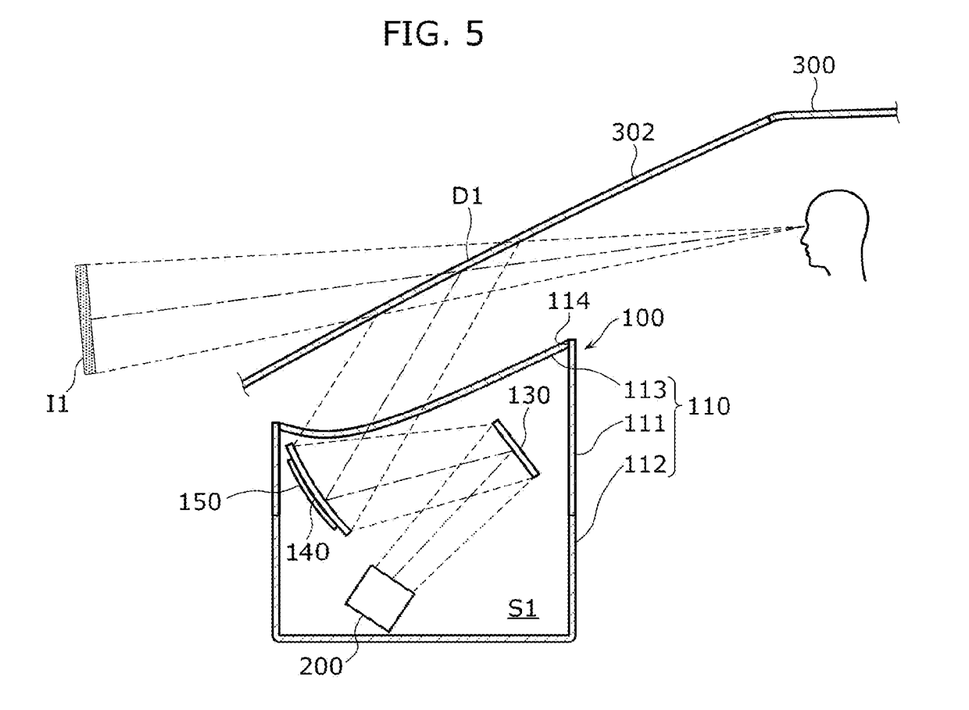
FIG. 5 is a diagram illustrating an example of usage of a head-up display according to an embodiment.
Figure 6:
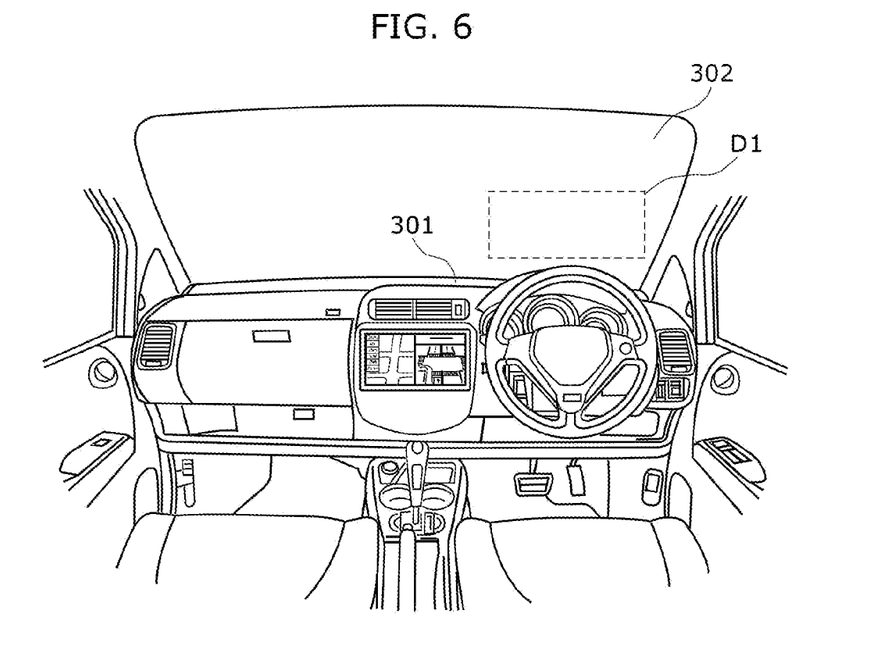
FIG. 6 is a diagram illustrating a display area in which an image displayed by the head-up display according to the embodiment is displayed.

FIG. 5 is a diagram illustrating an example of usage of head-up display 100 according to the embodiment. FIG. 6 is a diagram illustrating a display area in which an image displayed by head-up display 100 according to the embodiment is displayed.

Head-up display 100 according to the embodiment is an in-vehicle head-up display (HUD), and is provided near the top surface of dashboard 301 of vehicle 300.

This head-up display 100 projects light on area D1 (an area surrounded by a dashed line in FIG. 6) of windshield (front glass) 302 which is a display medium. Light projected on area D1 reflects off windshield 302 illustrated in FIG. 5. This reflected light reflected off windshield 302 travels toward the eyes of a driver who is a user of head-up display 100 and sits in the driver's seat. The driver perceives the reflected light that has entered their eyes as virtual image I1 shown on the opposite side of windshield 302 (outside the vehicle) with actual objects that can be seen through windshield 302 as the background. In this embodiment, the above-described series of events will be represented as head-up display 100 displaying virtual image I1 using windshield 302.

[Basic Configuration of Head-Up Display] A basic configuration of head-up display 100 will be described with reference to FIG. 5 through FIG. 7.

Head-up display 100 illustrated in FIG. 5 includes casing 110, fixed mirror 130, mirror 140 of a movable type, mirror holder 150, bearings (illustrations omitted), and display device 200.

Figure 7:
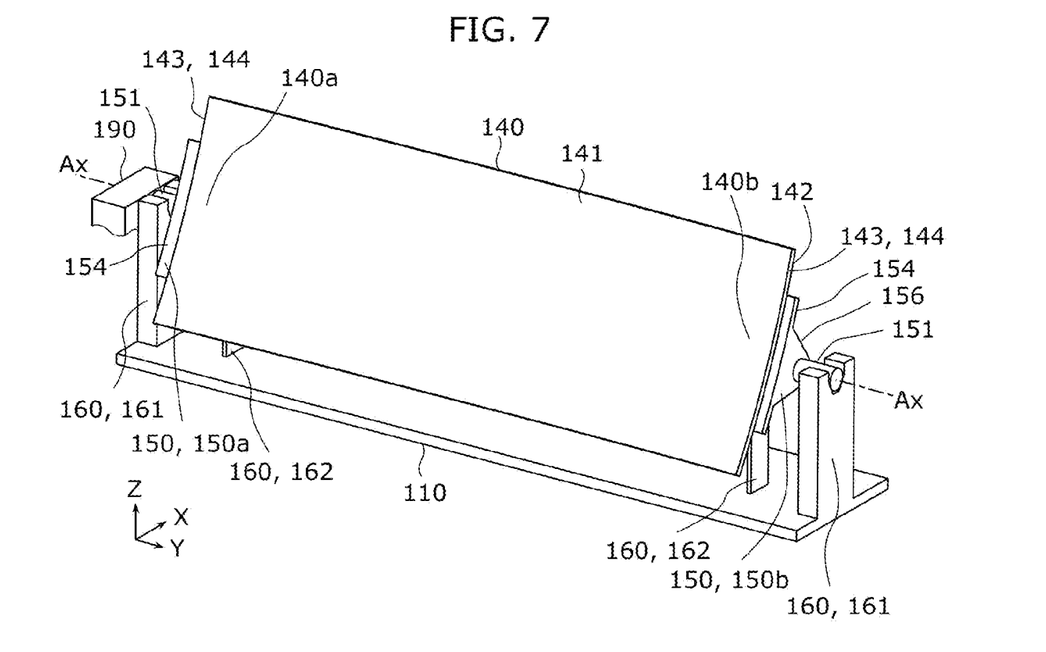
FIG. 7 is a perspective view of a mirror, a mirror holder, bearings, etc. of the head-up display according to the embodiment which are viewed from a reflective surface side.

FIG. 7 is a perspective view of mirror 140, mirror holder 150, bearings 160, etc. of head-up display 100 which are viewed from the reflective surface 141 side. FIG. 7 illustrates part of casing 110 below mirror 140, etc.

Note that from FIG. 7 on down, the Z axis direction represents the vertical direction, the X axis direction represents the traveling direction of a vehicle and a direction perpendicular to the Z axis direction, and the Y axis direction represents a direction perpendicular to both the Z axis direction and the X axis direction (the left-right direction of the vehicle).

As illustrated in FIG. 7, head-up display 100 includes various structural elements for connecting mirror holder 150 that supports mirror 140 to casing 110, and driver 190 for rotatably driving mirror 140 and mirror holder 150.

Driver 190 generates power for rotating mirror 140. Specifically, driver 190 is, for example, a motor that applies, to mirror holder 150, power for changing an angle of mirror 140. Driver 190 is secured to casing 110. The rotating shaft of driver 190 and first rotating shaft 151 of first mirror holder 150a are connected via a power transmission component. Power generated by driver 190 is transmitted to mirror holder 150 via the power transmission component. The power transmission component is, for example, a gear, but is not limited to a gear. The power transmission component may be a belt.

Casing 110 illustrated in FIG. 5 accommodates fixed mirror 130, mirror 140 of a movable type, mirror holder 150, bearings 160, and display device 200. Casing 110 includes casing upper portion 111 in which opening 114 is formed and which is the upper portion of a box-like body that is in a substantially parallelepiped shape elongated in the Y axis direction, casing lower portion 112 that is the lower portion of the box-like body, and light-transmissive cover 113 that seals opening 114 in casing upper portion 111. Casing upper portion 111 and casing lower portion 112 together create space S1 of casing 110. Casing 110 includes, for example, resin, but may include metal.

Display device 200 is one example of a picture generation unit (PGU) that emits light from a light source to a liquid crystal panel to emit an image. Note that although the whole display device 200 is accommodated in casing 110 in FIG. 5, only part of display device 200 may be accommodated in casing 110 or display device 200 may be provided outside casing 110.

Fixed mirror 130 is secured inside casing 110. Fixed mirror 130 reflects image light emitted from display device 200 toward mirror 140. Fixed mirror 130 is a quadrilateral, plate-like component elongated in the Y axis direction. Fixed mirror 130 includes, for example, a glass material.

Mirror 140 of a movable type further reflects image light reflected off fixed mirror 130. The image light reflected off mirror 140 is projected on windshield 302 via opening 114. With this, virtual image I1 that appears to be on the opposite side of windshield 302 (outside a vehicle) from a view of a driver sitting in the driver's seat is displayed.

[Detailed Configuration of Head-Up Display]

A detailed configuration of head-up display 100 will be described with reference to FIG. 8 through FIG. 12.

Figure 8:
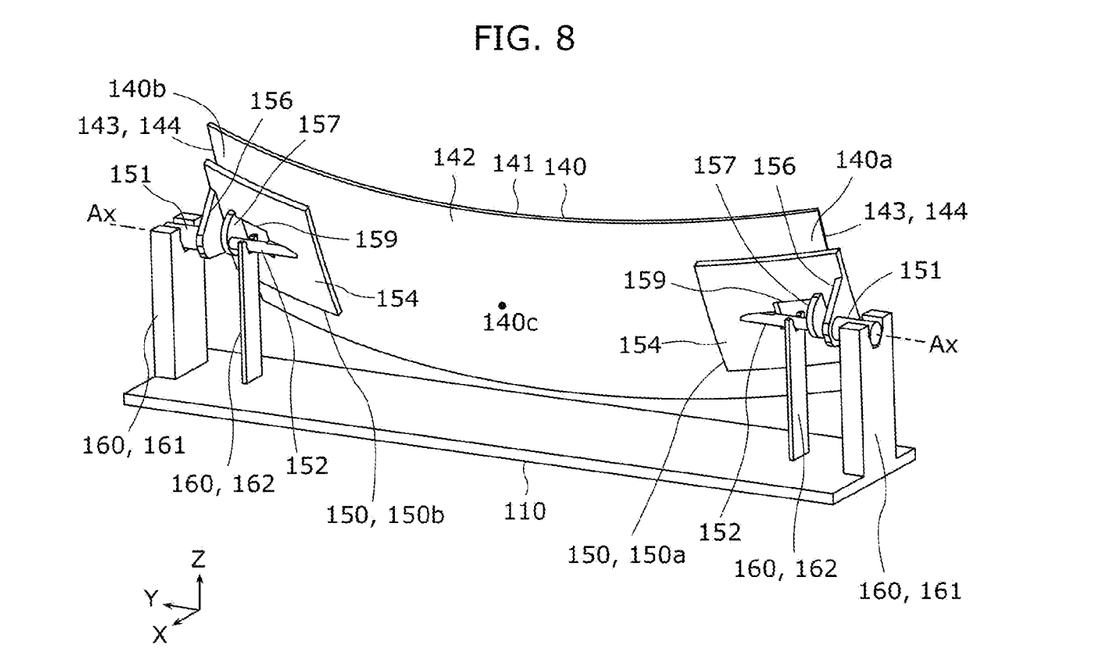
FIG. 8 is a perspective view of the mirror, the mirror holder, the bearings, etc. of the head-up display according to the embodiment which are viewed from a back surface side.

FIG. 8 is a perspective view of mirror 140, mirror holder 150, and bearings 160 of head-up display 100 which are viewed from the back surface 142 side. FIG. 8 illustrates part of casing 110 below mirror 140. Illustrations of driver 190 and pressing components 163 are omitted from FIG. 8.

As illustrated in FIG. 8, mirror 140 is rotatably supported about axis Ax of first rotating shafts 151 and second rotating shafts 152 via mirror holder 150. In this embodiment, axis Ax of first rotating shafts 151 and second rotating shafts 152 is parallel to the Y axis direction.

Mirror 140 is a concave mirror having a free-form surface. Specifically, mirror 140 has a cross section in a concave shape when viewed from above or below, and has a cross section in a concave shape when viewed from the axis Ax direction.

Mirror 140 includes, for example, a glass material, and is in a plate-like shape. Mirror 140 includes reflective surface 141 that reflects image light, back surface 142 opposite reflective surface 141, and side surfaces 143 that join reflective surface 141 and back surface 142 together. Reflective surface 141 and back surface 142 are parallel to each other, and side surfaces 143 are perpendicular to reflective surface 141 and back surface 142. When mirror 140 is viewed from the back surface 142 side, mirror 140 has perimeter 144 around the outside shape of mirror 140. Perimeter 144 is in the shape that matches with side surfaces 143. Moreover, when mirror 140 is viewed from the back surface 142 side, mirror 140 is rectangular in shape and has the two long sides extending along the axis Ax direction and the two short sides perpendicular to the axis Ax direction. Mirror 140 has two end portions in the axis Ax direction, which are one end portion 140a and the other end portion 140b on the opposite side of one end portion 140a.

Mirror holder 150 is a component that supports mirror 140. Mirror holder 150 supports mirror 140 from the back surface 142 side. Mirror holder 150 comprises first mirror holder 150a and second mirror holder 150b. First mirror holder 150a and second mirror holder 150b are disposed in the Ax direction with a predetermined space therebetween.

First mirror holder 150a supports one end portion 140a of mirror 140 in a state in which first mirror holder 150a is supported by casing 110 via bearing 160. Second mirror holder 150b supports the other end portion 140b of mirror 140 in a state in which second mirror holder 150b is supported by casing 110 via bearing 160 different from the above-mentioned bearing 160. Hereinafter, first mirror holder 150a out of first mirror holder 150a and second mirror holder 150b will be used as an example for describing the embodiment. Note that second mirror holder 150b has the same configuration as first mirror holder 150a.

First mirror holder 150a includes a rotating shaft for rotating mirror 140, contact surface portion 154 that contacts mirror 140, and a projecting plate portion that protrudes from contact surface portion 154 and connects to the rotating shaft.

The rotating shaft comprises first rotating shaft 151 and second rotating shaft 152. First rotating shaft 151 is located outside perimeter 144 of mirror 140 as viewed from the back surface 142 side of mirror 140, and second rotating shaft 152 is located inside perimeter 144 of mirror 140 as viewed from the back surface 142 side of mirror 140. First rotating shaft 151 and second rotating shaft 152 are cylindrical in shape, and are disposed on the same axis Ax. Note that the rotating shaft of second mirror holder 150b is also disposed on the same axis Ax. First rotating shaft 151 has a hollow structure. Second rotating shaft 152 may have a solid structure.

Figure 9:
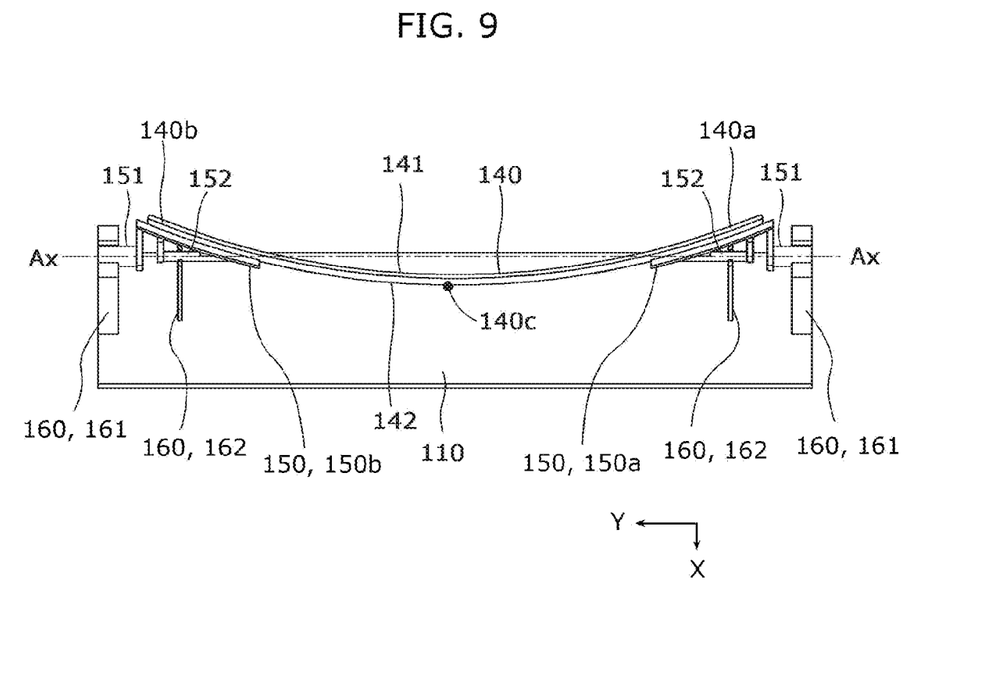
FIG. 9 is a top view of the mirror and the mirror holder according to the embodiment.

FIG. 9 is a top view of mirror 140 and mirror holder 150. FIG. 9 shows a diagram of head-up display 100 illustrated in FIG. 7 which is viewed from a diagonal back of head-up display 100.

In this embodiment, axis Ax of first rotating shaft 151 and second rotating shaft 152 of mirror holder 150 intersects with back surface 142 of mirror 140. Moreover, second rotating shaft 152 is narrower than first rotating shaft 151. The diameter of second rotating shaft 152 is, for example, greater than or equal to 0.5 times and less than 1 times the diameter of first rotating shaft 151. By making second rotating shaft 152 narrower than first rotating shaft 151, second rotating shaft 152 can be disposed in a vacant space on the back surface 142 side of mirror 140. Specifically, second rotating shaft 152 can be disposed within an area in the shape of a right triangle having the hypotenuse extending from an end portion of mirror 140 to center 140c of mirror 140.

Contact surface portion 154 illustrated in FIG. 8 supports mirror 140 along back surface 142 of mirror 140. Contact surface portion 154 is a curved plate, and is adhered to a part of back surface 142 of mirror 140 with an adhesive or a double-sided adhesive tape. An area size of contact surface portion 154 of first mirror holder 150a is smaller than an area size of back surface 142 of mirror 140, and is at least 0.05 times and at most 0.25 times the whole area size of back surface 142. Note that contact surface portion 154 is provided with open hole 159 for avoiding interference with distal end portion 160a of bearing 160 when first mirror holder 150a rotates.

The projecting plate portion comprises first projecting plate portion 156 and second projecting plate portion 157. First projecting plate portion 156 and second projecting plate portion 157 project from contact surface portion 154 toward a side opposite the reflective surface 141 side, and intersect with axis Ax of the rotating shaft. First projecting plate portion 156 and second projecting plate portion 157 are provided between first rotating shaft 151 and second rotating shaft 152 in the axis Ax direction of the rotating shaft. First projecting plate portion 156 and second projecting plate portion 157 are disposed spaced apart from each other in the axis Ax direction of the rotating shaft.

First projecting plate portion 156 is a reinforcing rib for reinforcing contact surface portion 154 and first rotating shaft 151. First projecting plate portion 156 is disposed outward of second projecting plate portion 157 in the axis Ax direction, and is connected to one end of first rotating shaft 151. In other words, first rotating shaft 151 has one end portion connected to first projecting plate portion 156. First projecting plate portion 156 may be perpendicular to first rotating shaft 151.

Second projecting plate portion 157 is a reinforcing rib for reinforcing contact surface portion 154 and second rotating shaft 152. Second projecting plate portion 157 is disposed inward (toward center 140c of mirror 140) of first projecting plate portion 156 in the axis Ax direction, and is connected to second rotating shaft 152. Second rotating shaft 152 has one end connected to second projecting plate portion 157 and the other end connected to contact surface portion 154. Second projecting plate portion 157 may be perpendicular to second rotating shaft 152.

Bearing 160 is a component that rotatably supports the rotating shaft of first mirror holder 150a. Bearing 160 is supported by casing 110. Bearing 160 comprises first bearing 161 and second bearing 162. First bearing 161 rotatably supports first rotating shaft 151 of first mirror holder 150a, and second bearing 162 rotatably supports second rotating shaft 152 of first mirror holder 150a.

Figure 10:
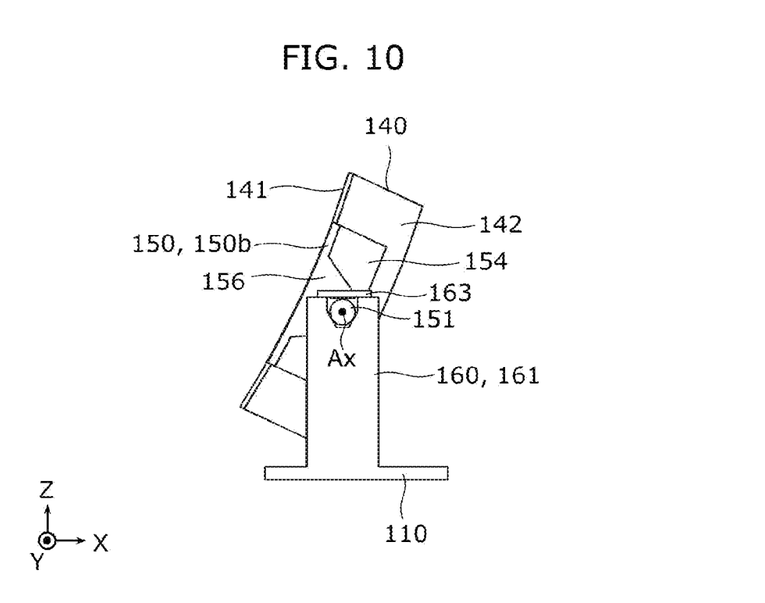
FIG. 10 is a diagram illustrating a first rotating shaft and a first bearing of a first mirror holder according to the embodiment which are viewed from a side.

FIG. 10 is a diagram illustrating first rotating shaft 151 and first bearing 161 of second mirror holder 150b which are viewed from a side.

As illustrated in FIG. 10, first bearing 161 includes a groove shape whose cross section is in the shape of U. The groove shape is not limited to the shape of U, and may be in the shape of V. First rotating shaft 151 is rotatably supported with respect to first bearing 161 in the state of being pressed against the groove by pressing component 163 that includes a flat spring. Second rotating shaft 152 is rotatably supported with respect to second bearing 162 in the state of being pressed against the groove by a pressing component that includes a flat spring (illustrations omitted).

Figure 11:
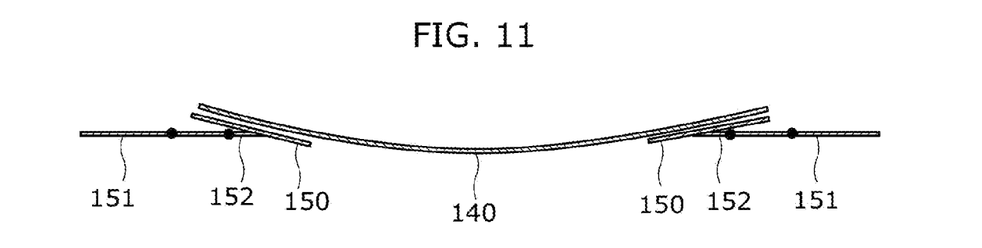
FIG. 11 is a diagram schematically illustrating a supporting state of the mirror and the mirror holder in the head-up display according to the embodiment.

FIG. 11 is a diagram schematically illustrating a supporting state of mirror 140 and mirror holder 150.

In head-up display 100 illustrated in FIG. 11, the rotating shaft of mirror holder 150 on the left is supported at the two points on the left side, and the rotating shaft of mirror holder on the right is supported at the two points on the right side (see black points shown in FIG. 11). Specifically, first rotating shaft 151 of first mirror holder 150a is supported by first bearing 161, and second rotating shaft 152 of first mirror holder 150a is supported by second bearing 162. Moreover, first rotating shaft 151 of second mirror holder 150b is supported by first bearing 161, and second rotating shaft 152 of second mirror holder 150b is supported by second bearing 162. Securing of one mirror holder 150 at two points as described above can prevent misalignment of mirror 140 due to vibrations.

Figure 12:
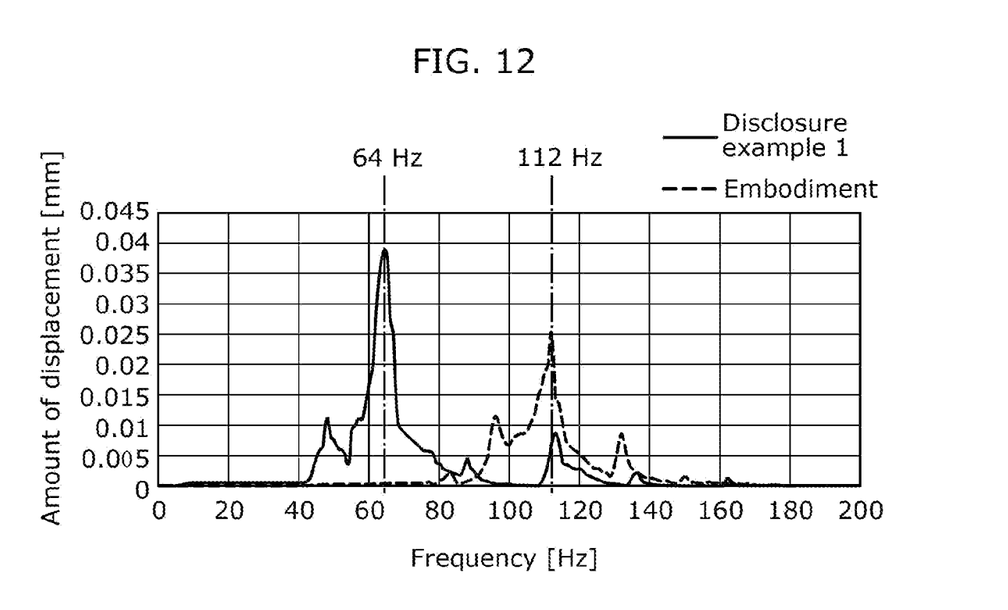
FIG. 12 is a diagram illustrating an amount of displacement of the mirror included in the head-up display according to the embodiment.

FIG. 12 is a diagram illustrating an amount of displacement of mirror 140 included in head-up display 100. The diagram shows an amount of displacement made by mirror 140 when a frequency of vibrations applied to the head-up display is changed. The diagram also shows data on head-up display 600 according to disclosure example 1 which is illustrated in FIG. 3.

As illustrated in FIG. 12, an amount of displacement of mirror 140 included in head-up display 100 according to the embodiment is small as compared to head-up display 600 according to disclosure example 1. Moreover, an amount of displacement is highest when the frequency of vibrations is at 64 Hz in disclosure example 1, whereas an amount of displacement is highest when the frequency of vibrations is at 112 Hz in the embodiment. For example, assuming that the highest frequency of vibrations transmitted from a vehicle when the vehicle is driven is 60 Hz, there is a less possibility that head-up display 100 according to the embodiment resonates with vibrations transmitted from the vehicle when the vehicle is driven as compared to head-up display 600 according to disclosure example 1, since the frequency at which an amount of displacement is highest in head-up display 100 according to the embodiment is far different from 60 Hz.

As described above, in head-up display 100 according to the embodiment, an amount of displacement made by vibrations is small and the frequency at which head-up display 100 resonates is high, as compared to head-up display 600 according to disclosure example 1. For this reason, it is possible to prevent misalignment of mirror 140 due to vibrations transmitted from a vehicle when the vehicle is driven.

[Variation of Embodiment]

Head-up display 100 according to a variation of the embodiment will be described with reference to FIG. 13.

Figure 13:
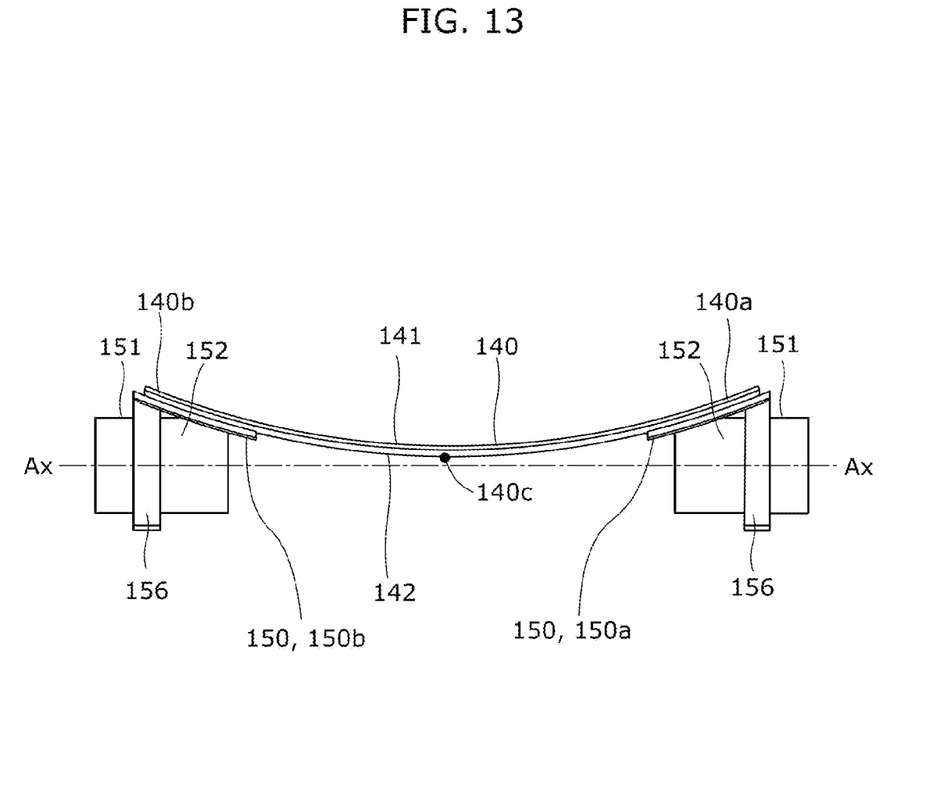
FIG. 13 is a schematic diagram illustrating a mirror and a mirror holder of a head-up display according to a variation of the embodiment which are viewed from above.

FIG. 13 is a schematic diagram illustrating mirror 140 and mirror holder 150 of head-up display 100 according to the variation of the embodiment which are viewed from above.

Mirror holder 150 according to the variation includes first rotating shafts 151 and second rotating shafts 152 that are shafts for rotating mirror 140, contact surface portions 154 that contact mirror 140, and projecting plate portions 156 that protrude from contact surface portions 154 and connect to the rotating shafts. Each projecting plate portion 156 is provided between first rotating shaft 151 and second rotating shaft 152.

In the variation illustrated in FIG. 13, axis Ax of first rotating shafts 151 and second rotating shafts 152 of mirror holder 150 does not intersect with back surface 142 of mirror 140, and is located outside back surface 142. Moreover, second rotating shafts 152 have the same thickness as first rotating shafts 151. By equating the thickness of second rotating shafts 152 with the thickness of first rotating shafts 151, the rigidity of second rotating shafts 152 can be improved. With this, it is possible to prevent misalignment of mirror 140 due to vibrations.

SUMMARY

Head-up display 100 according to the embodiment includes display device 200 that emits image light, mirror 140 that reflects the image light, mirror holder 150 that includes a rotating shaft, and bearing 160 that rotatably supports the rotating shaft. Mirror holder 150 supports mirror 140 from the back surface 142 side of mirror 140. The rotating shaft comprises first rotating shaft 151 located outside perimeter 144 of mirror 140 as viewed from the back surface 142 side of mirror 140, and second rotating shaft 152 located inside perimeter 144 of mirror 140 as viewed from the back surface 142 side of mirror 140. Second rotating shaft 152 is provided on an axis same as axis Ax of first rotating shaft 151. Bearing 160 supports first rotating shaft 151 and second rotating shaft 152.

As described above, bearing 160 supports first rotating shaft 151 and second rotating shaft 152 of mirror holder 150 to support mirror holder 150 at a plurality of points. With this, it is possible to prevent misalignment of mirror 140 due to vibrations.

Moreover, bearing 160 comprises first bearing 161 and second bearing 162. First bearing 161 may support first rotating shaft 151, and second bearing 162 may support second rotating shaft 152.

As described above, first bearing 161 supports first rotating shaft 151 of mirror holder 150 and second bearing 162 supports second rotating shaft 152 of mirror holder 150 to support mirror holder 150 at a plurality of points. With this, it is possible to prevent misalignment of mirror 140 due to vibrations.

In addition, head-up display 100 further includes casing 110 that accommodates display device 200, mirror 140, mirror holder 150, and bearing 160. Casing 110 may support first bearing 161 and second bearing 162.

With this configuration, first rotating shafts 151 and second rotating shafts 152 of mirror holder 150 are supported by casing 110 via first bearings 161 and second bearings 162. With this, it is possible to prevent misalignment of mirror 140 due to vibrations.

Moreover, second rotating shaft 152 may be narrower than first rotating shaft 151.

With this, second rotating shaft 152 can be disposed in a vacant space on the back surface 142 side of mirror 140, and thus the length of head-up display 100 in the vehicle traveling direction can be decreased. With this, it is possible to prevent misalignment of mirror 140 due to vibrations while head-up display 100 is downsized.

In addition, mirror holder 150 further includes contact surface portion 154 that contacts mirror 140 along back surface 142 of mirror 140, and a projecting plate portion that projects from contact surface portion 154 and connects to first rotating shaft 151 or second rotating shaft 152.

With this configuration, first rotating shaft 151, second rotating shaft 152, and contact surface portion 154 can be reinforced using the projecting plate portion. With this, it is possible to prevent misalignment of mirror holder 150 and mirror 140.

Moreover, the projecting plate portion comprises first projecting plate portion 156 and second projecting plate portion 157 that are disposed spaced apart from each other in axis Ax direction of the rotating shaft. First rotating shaft 151 is connected to first projecting plate portion 156. Second rotating shaft 152 includes one end that may be connected to second projecting plate portion 157 and the other end that may be connected to contact surface portion 154.

With this configuration, first rotating shaft 151 and contact surface portion 154 can be reinforced using first projecting plate portion 156, and second rotating shaft 152 and contact surface portion 154 can be reinforced using second projecting plate portion 157. With this, it is possible to prevent misalignment of mirror holder 150 and mirror 140.

In addition, mirror 140 includes one end portion 140a and the other end portion 140b which are located at end portions of the rotating shaft. The end portions are in the axis Ax direction. Mirror holder 150 may be comprised of first mirror holder 150a that supports one end portion 140a of mirror 140, and second mirror holder 150b that supports the other end portion 140b of mirror 140.

Accordingly, two end portions of mirror 140 are supported by first mirror holder 150a and second mirror holder 150b. With this, it is possible to prevent misalignment of mirror 140 due to vibrations.

Moreover, first rotating shaft 151 of second mirror holder 150b may have a hollow structure.

With this, it is possible to prevent misalignment of mirror 140 due to vibrations while the weight of second mirror holder 150b is reduced.

In addition, mirror 140 may be a concave mirror.

With this, it is possible to prevent misalignment of mirror 140 which is a concave mirror.

Moreover, axis Ax of the rotating shaft may intersect with back surface 142 of mirror 140.

With this configuration, the length of head-up display 100 in a vehicle traveling direction can be decreased. Accordingly, it is possible to prevent misalignment of mirror 140 due to vibrations while head-up display 100 is downsized.

In addition, head-up display 100 may further includes fixed mirror 130 different from mirror 140. Fixed mirror 130 may reflect, toward mirror 140, the image light emitted from display device 200.

The use of the above-described head-up display 100 can prevent misalignment of mirror 140. With this, image light exited from fixed mirror 130 and inputs to mirror 140 can be exited from mirror 140 in a state in which misalignment is prevented.

OTHER EMBODIMENTS

The embodiment has presented an example in which mirror 140 is rectangular in shape when mirror 140 is viewed from the back surface 142 side, but the shape of mirror 140 is not limited to the foregoing. For example, mirror 140 may be in the shape of a trapezoid having the top and the bottom sides extending along the axis Ax direction.

The embodiment has presented an example in which a mirror holder includes two projecting plate portions, but the mirror holder may include one projecting plate portion. For example, the projecting plate portion may be a single projecting plate portion that is an integration of a first projecting plate portion and a second projecting plate portion having no space therebetween.

The embodiment has presented an example in which a mirror holder is provided with two projecting plate portions, but the configuration of projecting plate portions is not limited to the foregoing. A mirror holder may be provided with another projecting plate portion different from first projecting plate portion 156 and second projecting plate portion 157.

The embodiment has presented an example in which first projecting plate portion 156 is perpendicular to first rotating shaft 151 and second projecting plate portion 157 is perpendicular to second rotating shaft 152, but the projecting plate portions need not be perpendicular to these rotating shafts. The projecting plate portions may intersect with these rotating shafts at a predetermined angle.

The following provides features of the head-up display that has been described based on the above-described embodiments.

[Technique 1]

A head-up display comprising:
a display device that emits image light;
a mirror that reflects the image light;
a mirror holder that includes a rotating shaft; and
a bearing that rotatably supports the rotating shaft, wherein The mirror holder supports the mirror from a back surface side of the mirror,
the rotating shaft comprises a first rotating shaft located outside a perimeter of the mirror as viewed from the back surface side of the mirror, and a second rotating shaft located inside the perimeter of the mirror as viewed from the back surface side of the mirror, the second rotating shaft being provided on an axis same as an axis of the first rotating shaft, and
the bearing supports the first rotating shaft and the second rotating shaft.

[Technique 2]

The head-up display according to technique 1, wherein
the bearing comprises a first bearing and a second bearing,
the first bearing supports the first rotating shaft, and
the second bearing supports the second rotating shaft.

[Technique 3]

The head-up display according to technique 2, further comprising:
a casing that accommodates the display device, the mirror, the mirror holder, and the bearing, wherein
the casing supports the first bearing and the second bearing.

[Technique 4]

The head-up display according to any one of techniques 1 to 3, wherein
the second rotating shaft is narrower than the first rotating shaft.

[Technique 5]

The head-up display according to any one of techniques 1 to 4, wherein
the mirror holder further includes a contact surface portion that contacts the mirror along a back surface of the mirror, and a projecting plate portion that projects from the contact surface portion and connects to the rotating shaft.

[Technique 6]

The head-up display according to technique 5, wherein
the projecting plate portion comprises a first projecting plate portion and a second projecting plate portion that are disposed spaced apart from each other in an axis direction of the rotating shaft, the first rotating shaft is connected to the first projecting plate portion, and the second rotating shaft includes one end connected to the second projecting plate portion and an other end connected to the contact surface portion.

[Technique 7]

The head-up display according to any one of techniques 1 to 6, wherein the mirror includes one end portion and an other end portion which are located at end portions of the rotating shaft, the end portions being in an axis direction, and the mirror holder comprises a first mirror holder that supports the one end portion of the mirror, and a second mirror holder that supports the other end portion of the mirror.

[Technique 8]

The head-up display according to technique 7, wherein the first rotating shaft of the second mirror holder has a hollow structure.

[Technique 9]

The head-up display according to any one of techniques 1 to 8, wherein the mirror is a concave mirror.

[Technique 10]

The head-up display according to any one of techniques 1 to 9, wherein the axis of the rotating shaft intersects with a back surface of the mirror.

[Technique 11]

The head-up display according to any one of techniques 1 to 10, further comprising:

a fixed mirror different from the mirror, wherein the fixed mirror reflects, toward the mirror, the image light emitted from the display device.

Hereinbefore, a head-up display according to one or more aspects of the present disclosure has been described based on embodiments, but the present disclosure is not limited to these embodiments. The present disclosure also encompasses: embodiments achieved by applying various modifications conceivable to those skilled in the art to each of the above embodiments; and embodiments achieved by combining structural elements in different embodiments without departing from the subject matter of the present disclosure.

While an embodiment has been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings, and claims is incorporated herein by reference in their entirety: Japanese Patent Application No. 2022-104838 filed on Jun. 29, 2022.

INDUSTRIAL APPLICABILITY

The present disclosure is useful for a head-up display provided for a vehicle.

The invention claimed is:
1. A head-up display comprising:
a display device that emits image light;
a mirror that reflects the image light;
a mirror holder that includes a rotating shaft; and
a bearing that rotatably supports the rotating shaft, wherein the mirror holder supports the mirror from a back surface side of the mirror, the rotating shaft comprises a first rotating shaft located outside a perimeter of the mirror as viewed from the back surface side of the mirror, and a second rotating shaft located inside the perimeter of the mirror as viewed from the back surface side of the mirror, the second rotating shaft being provided on the same side with respect to the mirror on an axis same as an axis of the first rotating shaft, the bearing supports the first rotating shaft and the second rotating shaft, the bearing comprises a first bearing and a second bearing, the first bearing supports the first rotating shaft, and the second bearing supports the second rotating shaft.

2. The head-up display according to claim 1, further comprising:

a casing that accommodates the display device, the mirror, the mirror holder, and the bearing, wherein the casing supports the first bearing and the second bearing.

3. The head-up display according to claim 1, wherein the second rotating shaft is narrower than the first rotating shaft.

4. The head-up display according to claim 1, wherein the mirror holder further includes a contact surface portion that contacts the mirror along a back surface of the mirror, and a projecting plate portion that projects from the contact surface portion and connects to the rotating shaft.

5. The head-up display according to claim 4, wherein the projecting plate portion comprises a first projecting plate portion and a second projecting plate portion that are disposed spaced apart from each other in an axis direction of the rotating shaft, the first rotating shaft is connected to the first projecting plate portion, and the second rotating shaft includes one end connected to the second projecting plate portion and an other end connected to the contact surface portion.

6. The head-up display according to claim 1, wherein the mirror includes one end portion and an other end portion which are located at end portions of the rotating shaft, the end portions being in an axis direction, and the mirror holder comprises a first mirror holder that supports the one end portion of the mirror and that includes the first rotating shaft, and a second mirror holder that supports the other end portion of the mirror and that includes the first rotating shaft.

7. The head-up display according to claim 6, wherein the first rotating shaft of the second mirror holder has a hollow structure.

8. The head-up display according to claim 1, wherein the mirror is a concave mirror.

9. The head-up display according to claim 8, wherein the axis of the rotating shaft intersects with a back surface of the mirror.

10. The head-up display according to claim 1, further comprising:

a fixed mirror different from the mirror, wherein the fixed mirror reflects, toward the mirror, the image light emitted from the display device.

11. The head-up display according to claim 1, wherein the mirror and the mirror holder are separate.

12. The head-up display according to claim 1, wherein coefficients of linear expansion of the mirror are different from coefficients of linear expansion of the mirror holder.

\* \* \* \* \*